United States Patent [19]

Miller

[11] 4,436,377

[45] Mar. 13, 1984

[54] TRANSMISSIVE REFLECTOR INCLUDING NACREOUS, PRESSURE SENSITIVE ADHESIVE LAYER

[75] Inventor: James A. Miller, Silver Lake, Ohio

[73] Assignee: Morgan Adhesives Company, Stow, Ohio

[21] Appl. No.: 204,581

[22] Filed: Nov. 6, 1980

[51] Int. Cl.³ .................... G02F 1/133; G42D 15/00; C09K 3/34; B32B 5/16
[52] U.S. Cl. .................................. 350/345; 350/338; 428/204; 428/363; 428/1; 283/91
[58] Field of Search ............... 350/339, 345, 338, 105, 350/431; 252/583, 584; 526/268; 283/91, 92, 97, 108, 111; 428/204, 363, 386, 387, 1

[56] References Cited

U.S. PATENT DOCUMENTS

| | | | |
|---|---|---|---|
| 3,725,122 | 4/1973 | Reinhard et al. | 526/263 X |
| 3,984,176 | 10/1976 | Hirai et al. | 350/339 D X |
| 4,096,550 | 6/1978 | Boller et al. | 350/345 X |
| 4,112,215 | 9/1978 | Boessler et al. | 526/263 X |
| 4,145,511 | 3/1979 | Gilles | 526/263 X |
| 4,157,418 | 6/1979 | Heilmann | 350/263 X |
| 4,196,973 | 4/1980 | Hochstrate | 350/345 X |
| 4,232,079 | 11/1980 | Raphael et al. | 428/195 |
| 4,355,868 | 10/1982 | Perregaux et al. | 350/345 X |

OTHER PUBLICATIONS

Patton, Ed. "Nacreous (Pearlescent) Pigments" *Pigment Handbook*, John Wiley and Sons, New York (1973), pp. 871–890.

Berreman, "Electrical and Optical Properties of Twisted Nematic Structures", *Non Emmissive Electrooptic Displays*, Plenum Press, N.Y. 1976, pp. 9–11.

Skeist, *Handbook of Adhesives*, 2nd Edition, 1977 Reinhold Van Nostrads.

*Primary Examiner*—John K. Corbin
*Assistant Examiner*—David Lewis
*Attorney, Agent, or Firm*—Oldham, Oldham, Hudak, Weber & Sand Co.

[57] ABSTRACT

A transmissive reflector which both reflects light and lets light pass therethrough. The transmissive reflector comprises a nacreous pigment in combination with a transparent adhesive. The nacreous pigment and the transparent adhesive can be separately coated on a clear or transparent substrate or combined as a blend or mixture thereon. The transmissive reflector imparts lustre or a pearlescent effect to light as well as diffuses the light and, thus, enhances the appearance of various articles such as transparencies, rear projection screens, projection television, and the like. Also, when utilized as a reflector as for a background, the reflected light has a lustre imparted thereto and thus any article displayed is distinctly set forth, as for example, a liquid crystal readout, and the like.

21 Claims, 3 Drawing Figures

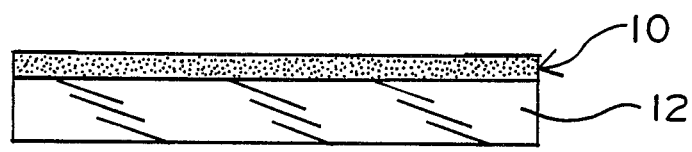
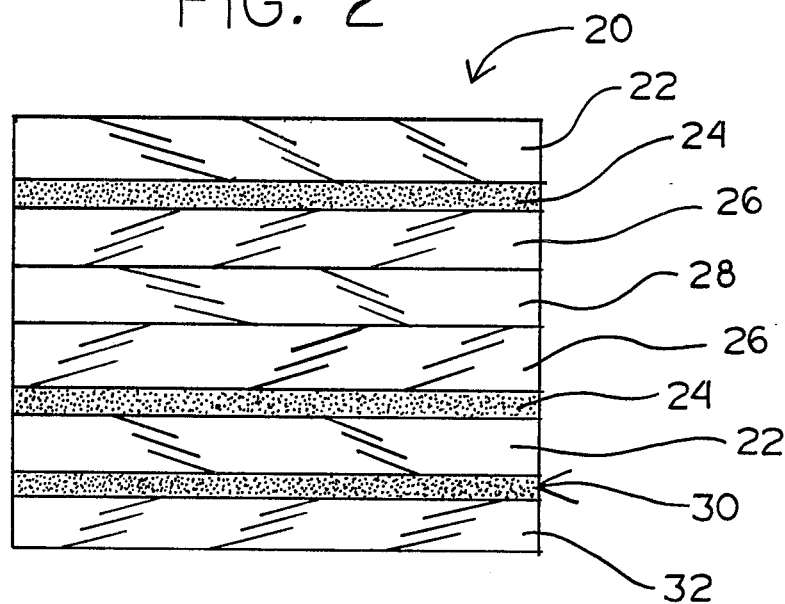
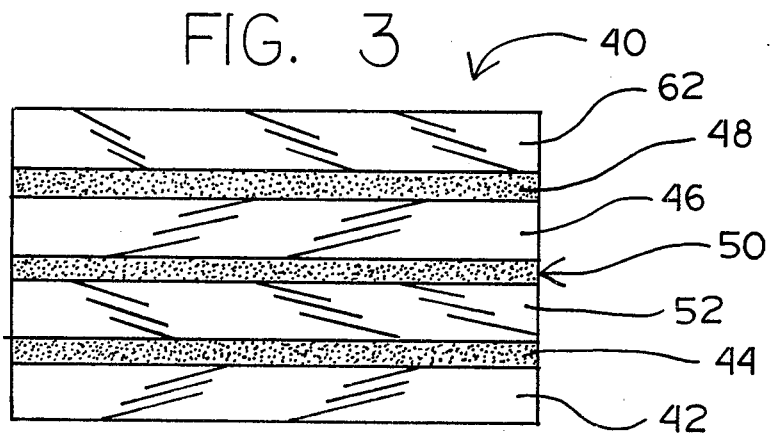

TRANSMISSIVE REFLECTOR INCLUDING NACREOUS, PRESSURE SENSITIVE ADHESIVE LAYER

TECHNICAL FIELD

The present invention relates to a transmissive reflector of a nacreous pigment-transparent adhesive combination and imparts a lustre to light striking it. The transmissive reflector can be applied to at least one side of a transparent substrate.

BACKGROUND ART

Heretofore, nacreous pigments have been utilized in pearlescent paint, fingernail polish, lipstick, and the like, to produce a lustrous effect.

A liquid crystal readout generally is a sandwich that has a symmetrical construction, with two outer polarized films or layers, a transparent pressure sensitive adhesive layer residing on the inner side of each said polarized layer, a glass layer residing on the remaining side of each of said pressure sensitive adhesive, and a liquid crystal medium residing in the center of said construction. Light can be transmitted through either side of the construction or laminate or reflected. A conventional background, for example, a painted surface, paper, a metallic surface, is utilized. Thus, a conventional readout or background effect is produced.

In the area of color transparencies for backlighted displays, that is displays in which light is transmitted through the displayed article, generally three different types of laminates or constructions are utilized. In the first, proceeding in the direction of the light, the following layers exist. A white diffuser layer, a clear plastic sheet, a polyester film, a color transparency and, optionally, a matte overlay film. Between each noted layer exists a transparent pressure sensitive adhesive layer. Usually, the polyester layer containing pressure sensitive adhesive on each side of it is in the form of a double-faced pressure sensitive adhesive tape, with the polyester being the carrier layer. The embodiment, upon use, tends to have some bubble formation buildup on the plastic layer adjacent to the polyester layer due to moisture contained in the plastic sheet. However, the white diffuser layer, along with the matte overlay film, tends to mask the bubble formation. Due to the multiplicity of layers, this particular laminate tends to be expensive.

A second construction, going in the direction of travel of light, contains a white diffuser layer, a color transparency, a polyester layer, and a plastic, e.g., an acrylic matte sheet or layer. Once again, a transparent or clear pressure sensitive adhesive layer exists between each of the immediately above-noted layers with the polyester-adhesive layer generally being in the form of a double-faced pressure sensitive tape. This system is less exensive than the first, but usually shows more bubbles. Thus, this construction suffers an aesthetic loss.

In a third construction, in the direction of light traveled, the following layers exist: a white translucent or diffusing plastic sheet or layer, a polyester film, a color transparency, and optionally, a matte overlay film. The same arrangements exist for the location of the pressure sensitive adhesive layers, as well as the utilization of a double-faced pressure sensitive adhesive tape. This construction also contains bubble formation upon use, although the aesthetics are somewhat improved with the matte overlay, that is, less glare.

Regardless of the construction, a pearlescent or lustre is not produced and all tend to have visible bubble formation.

DISCLOSURE OF INVENTION

It is therefore an object of the present invention to provide a transmissive reflector containing a pearlescent-imparting pigment and an adhesive.

It is another object of the present invention to provide a transmissive reflector, as above, which imparts a lustre and attractive appearance to various lighted articles or items.

It is yet another object of the present invention to provide a transmissive reflector, as above, in which said pearlescent-imparting pigment is a nacreous pigment.

It is yet another object of the present invention to provide a transmissive reflector, as above, in which bubble formation noticeability is abated.

It is yet another object of the present invention to provide a transmissive reflector, as above, which eliminates the need for a diffusing layer in the laminate.

It is yet another object of the present invention to provide a transmissive reflector, as above, wherein said nacreous pigment and a transparent adhesive exist as separate layers or as a blend or mixture on a clear or transparent substrate layer.

It is yet another object of the present invention to provide a transmissive reflector, as above, wherein said adhesive is a transparent pressure sensitive adhesive.

It is yet another object of the present invention to provide a transmissive reflector, as above, wherein the particle size of said nacreous pigment ranges from about 1 to about 150 microns and wherein the amount of said pigment ranges from about 5 to about 60 parts per 100 parts of said adhesive.

It is yet another object of the present invention to provide a transmissive reflector, as above, wherein said nacreous pigment adhesive mixture coated on said substrate can be utilized in a transmissive capacity.

It is yet another object of the present invention to provide a transmissive reflector, as above, wherein said nacreous pigment-adhesive mixture coated on said substrate can be utilized as a reflector.

It is yet another object of the present invention to provide a transmissive reflector, as above, wherein said nacreous pigment-adhesive mixture on said substrate is utilized in combination with a transparency mounting arrangement.

It is yet another object of the present invention to provide a transmissive reflector, as above, wherein said nacreous pigment-adhesive mixture on said substrate is utilized as a background for a liquid crystal readout.

These and other objects of the present invention will become apparent from the following specification.

In general, a transmissive reflector, comprises: a nacreous pigment and a transparent adhesive, said nacreous pigment being in combination with said adhesive.

In general, a process for making a transmissive reflector, comprises the steps of: obtaining a nacreous pigment; obtaining a transparent adhesive; and forming a coating layer with said nacreous pigment and said adhesive so that said coating imparts pearlescence to light striking it.

Additionally, a transmissive reflector for imparting pearlescence to light striking said transmissive reflector, comprises: a coating, said coating containing a pearlescent imparting pigment and a transparent adhesive, the amount of said pigment in said coating being sufficient to impart pearlescence to light striking said coating.

BRIEF DESCRIPTION OF DRAWINGS

FIG. 1 is a cross-sectional view of a transmissive reflector of the present invention which is adhered to a transparent substrate.

FIG. 2 is a cross-sectional view of a liquid crystal display laminate containing a transmissive reflector as a background.

FIG. 3 is a cross-sectional view of a color transparency display laminate containing a transmissive reflector as a transmissive medium.

BEST MODE FOR CARRYING OUT THE INVENTION

The present invention relates to a transmissive reflector containing a nacreous pigment in combination with a transparent adhesive. Preferably, the pigment-adhesive combination exists on a clear or transparent substrate. A transmissive reflector is an item which diffuses light while reflecting a portion of the incident light as well as transmits the remaining light therethrough. A pearlescent or nacreous-imparting pigment is a pigment which adds, imparts, or transmits pearlescent or lustre to light passing therethrough or being reflected therefrom. In other words, a lustre or a pearlescent effect is produced by the light striking such pigment. Generally, any nacreous pigment can be utilized. A nacreous pigment contains transparent platelets of high refractive index. Generally, the nacreous pigments derive the platelet shape from mica and the high refractive index from an oxide coating, usually a metallic oxide coating. Examples of metallic oxide coatings, which also impart color, include titanium dioxide, iron oxide, and chrome oxide. The titanium dioxide is generally of the Rutile or the Anatase structure. The colors include white, gold, bronze, copper, silver, red, etc. Such pigments are commercially available from the Mearl Corporation of New York, under the trademark Mearlin, or from E. M. Laboratories of Elmsford, N.Y., under the trademark Afflair or Iriodin.

The adhesive can generally be any clear or transparent adhesive which is commercially available or known to the art. Thus, generally any of the transparent or clear heat-activated, solvent-activated, pressure sensitive, etc., types of adhesives can be utilized. Basic classes of such adhesives include the acrylic-based adhesives, the polyisobutylene adhesives, the polyvinyl ether adhesives, the vinyl homopolymer or copolymer adhesives, and the like. Naturally, such adhesives contain various known and conventional additives or agents such as elastomers, tackifiers, protective agents, etc. Due to ease of application, constant or even thickness, lack of solvents, etc., pressure sensitive adhesives are preferred. Pressure sensitive adhesives are often of a polyisobutylene type, a polyvinyl ether type, to a lesser extent, an acrylic type, and the like. Examples of specific adhesives including pressure sensitive adhesives are found in Handbook of Adhesives by Skeist, Van Nostrad Reinhold, 2nd Edition, 1977. A specific example of a pressure sensitive adhesive is the copolymer of 2-ethyl-hexyl-acrylate and butylacrylate. Other specific examples are the acrylic functional aminocarboxylic acids and derivatives as components of a pressure sensitive adhesive, U.S. Pat. No. 4,172,934 to Heilmann, which is hereby fully incorporated by reference. According to the present invention, generally any transparent or clear pressure sensitive adhesive, which are well known to the art, set forth in the literature, commonly known or commercially available, can be utilized.

The clear substrate can be glass or any other transparent or clear material. However, since in various applications the brittleness of the glass may be a disadvantage, the substrate is usually a clear or transparent plastic. Often referred to as a carrier in the pressure sensitive art, such carriers are well known to the literature, as well as those skilled in the art. Generally, polyester substrates are the most common, with other specific plastics including cellulose acetate, cellulose acetate butyrate, polypropylene, polycarbonate, polyvinylchloride, polyethylene, and the like. The carrier may be of conventional thickness such as from about 0.1 to about 25 mil.

The nacreous pigment exists in combination with the adhesive. Desirably, the amount of pigment is such to impart or pearlescent effect to light striking the transmissive reflector item. That is, an amount of pigment is utilized, such that a lustre is produced. Too little pigment results in too little or no lustre effect, when the item is utilized in a transmissive or reflective capacity. Too much pigment generally results in a blocking effect of the light, thereby preventing most of the light from passing through and rendering the transmissive reflector too dark (opaque) or unsuitable for use in a transmissive capacity. Additionally, too much pigment with the adhesive (pigment-adhesive mixture) or with the binder (pigment layer) degrades the ability of the adhesive or the binder to maintain the pigment within the layer.

Generally, the particle size of a nacreous pigment is important in that, if the particle size is too large, the result is a transmitted or reflected light which is too glittery and generally too diffused. On the other hand, if the particle size is too small, a lustre or pearlescent effect is not achieved. The particle size of the nacreous pigment generally ranges from about 1 to about 150 microns, desirably from about 2 to about 50 microns, and preferably from about 2 to about 40 microns.

A specific combination of a pigment-adhesive system is the existence of the nacreous pigment in a layer or coating upon the substrate with the adhesive coating residing as a layer either over or under, or on both sides, of the pigment. The pigment is applied either to the substrate or to the adhesive layer as a coating or layer wherein the pigment is contained in and bound by a conventional transparent binder resin such as a lacquer, a clear varnish, a clear urethane, and the like. In such a layer, the amount of the pigment ranges from about 5 to about 60, and preferably from about 15 to about 30 parts by weight, based upon 100 parts of binder. The thickness of the nacreous pigment layer or coating upon the substrate generally will range from about 0.2 mil to about 10 mil, desirably from about 0.5 mil to about 5 mil, and preferably from 1 mil to about 3 mil. The thickness of the adhesive layer can range from about 0.1 mil to 10 mil.

Preferably, the pigment and the adhesive, for example, a pressure sensitive adhesive, are mixed or blended and then applied to the substrate. To achieve a suitable lustre, the particle size generally lies within a range set forth above. The amount of nacreous pigment utilized per 100 parts by weight of non-solvent adhesive, that is the amount of adhesive solid (i.e., without any solvents thereon, or upon evaporation of any and all solvents therein), is from about 5 to about 60, with a range of from about 15 to about 30 being preferred. Generally, the total thickness of the adhesive-pigment mixture on the substrate ranges from about 0.20 to about 10 mil, desirably from about 0.5 to about 5 mil, and preferably from about 1 to about 3 mil.

These ranges serve as a guide for most applications. However, it should be appreciated that situations exist, for example wherein a high light lumen concentration is utilized, the thickness may be thicker and still yield the same effect.

Once the nacreous pigment and the adhesive have been combined, either as separate layers or as a blend or mixture, it can be wrapped by conventional items, e.g., a release paper, etc., in any shape or form, for example, a roll of tape, in flat form, etc. Preferably, it is applied to the substrate surface. The nacreous pigment-adhesive layers or mixture can be applied to both sides of the substrate or preferably to only one side thereof. The combination of the substrate and the pigment-adhesive layers or mixture can exist in the form of a roll, for example a tape which has been rolled upon itself, a sheet, or any other convenient or conventional form. In order to protect the pigment-adhesive system from dust, dirt, and the like, a conventional release liner may be applied thereto. For example, a silicon-coated craft paper, or plastic release liner may be utilized. Before the transmissive reflector is applied to a specific article, or the like, the wrapper, release liner, etc., is simply removed and the transmissive reflector applied and secured, through the adhesive system, to the article.

The net effect of the transmissive reflector is to add lustre or to produce a pearlescent effect upon light, either passing through or being reflected from the transmissive reflector. When the transmissive reflector is utilized in a transmissive capacity, either transparent or opaque articles can be used in association therewith. Considering the use of transparent articles, they will be asethetically enhanced with regard to their appearance. Specific examples of articles through which light passes include color negatives, black and white negatives, transparent paper prints, color transparencies, black and white transparencies, dye transfers, screen printed clear films, rear projection screens, projection televisions, and the like. Articles or items through which light does not pass (opaque), can serve as a foreground on the transmissive reflector, that is the transmissive reflector as a lustre background. Additionally, the article may be partially transparent so that a background as well as the article thereon are lustrified. Naturally, generally any non-light transmitting article can be utilized such as paint, metal, various designs made of an opaque material, various decorative schemes, and the like. It is noted that when utilized as a background, the number of uses for the transmissive reflector are myriad.

Additionally, the transmissive reflector can be utilized as a reflector to impart lustre or to produce a pearlescent effect upon light being reflected therefrom. Moreover, if a transparent article such as a color transparency, etc., is used, it will be aesthetically enhanced. Should the article be opaque, the article will still be aesthetically set forth in that the reflected light will serve as a background, as for example, a liquid crystal readout, a printed sign, etc., and the like.

Thus, the transmissive reflector can be utilized in any light situation wherein light is transmissive through an article, or in which light is reflective therefrom. When utilized as a transmissive media, the article is usually placed in front of the transmissive reflector. That is, the incident light will first pass through the transmissive reflector, and then pass through or about the article. When utilized as a reflector, the article is also usually placed in front of the transmissive reflector. That is, the incident light will first strike the article side of the transmissive reflector.

Referring to FIG. 1, a transmissive reflector, generally indicated by the numeral 10, is shown attached to a clear plastic substrate 12. As previously noted, the substrate can be made of polyester, with the adhesive being a clear acrylic pressure sensitive adhesive type. The particle size of the nacreous pigment, the amount of pigment blended with the adhesive, and the thickness of the pigment-adhesive layer are generally as previously noted. The transmissive reflector, either by itself or in combination with the substrate, can be utilized for many, many applications, as noted above, and in numerous combinations with other transparent items, layers, etc., to make a specific product.

In order to further describe the present invention, two specific structures utilizing the transmissive reflector will be illustrated and described, it being understood that many, many other structures can be made according to the present invention.

A particular structure or embodiment relates to utilizing the transmissive reflector in association with an article, for example, liquid crystal displays as in a watch or other item. Referring to FIG. 2, the liquid crystal display containing the transmissive reflector system of the present invention is shown and generally indicated by the numeral 20. A typical liquid crystal display is arranged in a sandwich or symmetrical form, and contains polarized layers 22. A conventional adhesive such as a clear pressure sensitive adhesive 24 is located inwardly of the polarized layer. Glass layers 26 are located inwardly of adhesive layers 24. The center of the sandwich contains the liquid crystal medium 28 which can give readouts with regard to time, temperature, etc., and the like. To this typical liquid crystal system or laminate has been added a transmissive reflector 30. Layer 32 constitutes the use of a clear substrate which serves to protect the nacreous pigment-adhesive transmissive reflector. When added to one side of the liquid crystal display, a lustre or pearlescent background, through reflection, is produced which accentuates and enhances the appearance of the liquid crystal readout. Moreover, it is noted that transmissive reflector 30 is readily, rapidly and easily applied to the liquid crystal display.

Yet another specific use of the transmissive reflector is shown in FIG. 3. In this drawing, the transmissive reflector is utilized in combination with a color transparency to add lustre or a luminescent effect to the color transparency. The color transparency laminate of FIG. 3, generally indicated by the numeral 40, contains a clear plastic sheet 42, for example, an acrylic sheet, on one side thereof. Moving in the direction of light traveled, the next item is a clear pressure sensitive layer 44 followed by a transparent substrate 52. The next layer is the transmissive reflector, generally indicated by the numeral 50. As in FIGS. 1 and 2, the transmissive reflector comprises a mixture of a nacreous pigment-pressure sensitive adhesive mixture. Layer 46 constitutes the color transparency which often is in the form of a color slide or the like. A clear pressure sensitive adhesive 48 binds the color transparency to a matte overlay film or layer 62 which produces a non-gloss surface. It is noted that adhesive layer 44 and substrate 52 can be eliminated so that transmissive reflective layer 50 adheres plastic sheet 42 to color transparency 46. In either case, due to the use of the transmissive reflector, a diffusing layer is eliminated which would otherwise be required. Moreover, photogenic effect of the transparency is much more vivid, has a lustre, as compared to prior art conventional laminates, and yet is detailed. The net result is a mounting which imparts liveliness or vibrant effect to the transparency contained therein. A still further advantage is that any bubbles contained between the plastic layer 42 and transmissive reflector 50 are fairly well or completely masked or hidden.

Many other uses of the transmissive reflector of the present invention exist, as noted above, for example, a rear projection screen, that is a screen containing the transmissive reflector onto which a photograph or scene is projected, the backdrop in a play, or in a television studio, a photography studio, and the like.

EXAMPLE

A nacreous-adhesive mixture was prepared in accordance with the following formulas and applied to the polyester film.

TABLE I

| COMPOUND | EXAMPLE (Parts By Weight) | | | | |
|---|---|---|---|---|---|
| | 1 | 2 | 3 | 4 | 5 |
| Durotak 80-1047[1] | 236 | 236 | 236 | 236 | 236 |
| Toluene | 41 | 41 | 41 | 41 | 41 |
| Butylacetate | 41 | 41 | 41 | 41 | 41 |
| Uformite F-200-E[2] | 1 | 1 | 1 | 1 | 1 |
| Iriodin[3] | 16 | 0 | 25 | 0 | 50 |

[1] an acrylic multipolymer resin manufactured by National Starch & Chemical Co., containing 40 percent solids by weight
[2] a melamine crosslinking compound manufactured by Reichhold Chemical Co.
[3] a nacreous pigment manufactured by E.M. Laboratories The toluene and butylacetate solvents were added to the nacreous pigment to wet it. Then, all the compounds were mixed. The mixture was then added at a 3.0 grams per 100 square inches to an 80-pound clay-coated Kraft paper and laminated to a 0.002-inch polyester film, both glossy and matte finishes. The layer of the adhesive nacreous pigment mixture was approximately 1.8 mil. The laminate containing the mixtures of formulas 2 and 4 gave an ordinary nonlustrous appearance. However, the laminates containing formulations 1,3, and 5 gave a lustrous and vibrant appearance and still transmitted light therethrough. The lamination containing formula 3 gave the best lustrous or pearlescent appearance.

While in accordance with the patent statutes, the best mode and preferred embodiments of the present invention have been described in detail, the scope of the invention is to be limited by the appended claims.

What is claimed is:

1. A transmissive reflector, comprising;
a nacreous pigment and a transparent adhesive, the amount of said nacreous pigment being from 15 to 30 parts by weight based upon 100 parts by weight of said adhesive, said nacreous pigment having a particle size of from 2 to 50 microns, said nacreous pigment being in combination with said adhesive, said combination being a mixture.

2. A transmissive reflector according to claim 1, wherein said nacreous pigment-adhesive combination has a thickness of from about 0.2 to about 10 mil.

3. A transmissive reflector according to claim 2, wherein said thickness is from about 0.5 to about 5 mil and wherein said particle size ranges from about 2 to about 40 microns.

4. A transmissive reflector according to claim 3, wherein said nacreous pigment is a metallic oxide coated mica platelet.

5. A transmissive reflector according to claim 1, 2, or 4, including a transparent substrate, said adhesive-nacreous pigment combination adhered to at least one side of said substrate.

6. A transmissive reflector according to claim 5, wherein said adhesive is a pressure sensitive adhesive.

7. A transmissive reflector according to claim 5, including a liquid crystal display, said pigment-adhesive mixture layer adhered to said liquid crystal display so that a lusture background is produced.

8. A transmissive reflector according to claim 7, wherein said liquid crystal display has
a liquid crystal medium and a glass layer, said glass layer residing on either side of said liquid crystal medium,
a pressure sensitive adhesive, said pressure sensitive adhesive located on the outside of each glass layer, and
a polarized film, said polarized film located on the outside of each said adhesive layer, the transmissive reflector located on one side of said polarized film.

9. A transmissive reflector according to claim 5, including a transparent article mounted on said transmissive reflector so that a lustrified article is produced.

10. A transmissive reflector according to claim 5, including an article, said article adhered to said pigment-adhesive layer so that a lustre background is produced.

11. A process for making a transmissive reflector, comprising the steps of:
obtaining a nacreous pigment,
obtaining a transparent adhesive, and
mixing said nacreous pigment and said adhesive, wherein the amount of said nacreous pigment in said mixture ranges from 15 to 30 parts by weight based upon 100 parts by weight of said adhesive, and wherein the particle size of said pigment ranges from 2 to 50 microns, and wherein the thickness of said pigment-adhesive layer ranges from 0.5 to 5 mils.

12. A process according to claim 11, including applying said nacreous pigment-adhesive coating to at least one side of a transparent substrate, the thickness of said coating ranging from about 0.2 to about 10 mils.

13. A process according to claim 12, including applying an article to said nacreous pigment-adhesive coating so that a lustrified background is formed with respect to said article.

14. A process according to claim 19, including applying a transparent article to said nacreous pigment-adhesive coating so that said article is lustrified.

15. A process according to claim 11, 12, 13 or 14, wherein said adhesive is a pressure sensitive adhesive.

16. A transmissive reflector for imparting pearlescence to light striking said transmissive reflector, comprising:
a coating, said coating containing a mixture of a pearlescent imparting pigment and a transparent adhesive, the amount of said pigment in said coating ranging from 15 to 30 parts by weight based upon 100 parts by weight of said adhesive, and wherein the particle size of said pigment ranges from 2 to 50 microns, and wherein the thickness of said coating ranges from 0.5 to 5 mils.

17. A transmissive reflector according to claim 16, wherein said adhesive-pigment coating ranges from about 0.20 mil to about 10 mil in thickness.

18. A transmissive reflector according to claim 17, including a transparent substrate, said coating adhered to at least one side of said substrate.

19. A transmissive reflector according to claim 18, wherein said adhesive is a pressure sensitive adhesive.

20. A transmissive reflector according to claims 17, 18, or 19, including an article, said article adhered to said coating so that said coating provides a pearlescent background.

21. A transmissive reflector according to claim 20, wherein said article is transmissive so that said article is pearlescent.

* * * * *